(12) United States Patent
Andree et al.

(10) Patent No.: US 12,703,294 B2
(45) Date of Patent: Aug. 11, 2026

(54) COMPONENT ASSEMBLY COMPRISING SPACE-SAVING DETENT CONNECTION

(71) Applicant: Bayerische Motoren Werke Aktiengesellschaft, Munich (DE)

(72) Inventors: Helge Andree, Landshut (DE); Steffen Schadt, Erding (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 695 days.

(21) Appl. No.: 18/001,328

(22) PCT Filed: May 7, 2021

(86) PCT No.: PCT/EP2021/062148

§ 371 (c)(1),
(2) Date: Dec. 9, 2022

(87) PCT Pub. No.: WO2021/249702

PCT Pub. Date: Dec. 16, 2021

(65) Prior Publication Data

US 2023/0249606 A1 Aug. 10, 2023

(30) Foreign Application Priority Data

Jun. 10, 2020 (DE) ..................... 10 2020 115 393.7

(51) Int. Cl.
*B60Q 1/04* (2006.01)

(52) U.S. Cl.
CPC .................................. *B60Q 1/0441* (2013.01)

(58) Field of Classification Search
CPC .... B60Q 1/0441; F21V 17/16; F21V 19/0035
See application file for complete search history.

(56) References Cited

U.S. PATENT DOCUMENTS

| | | | | |
|---|---|---|---|---|
| 3,518,727 A | 7/1970 | Eberle et al. | | |
| 2011/0260848 A1* | 10/2011 | Rodriguez Barros | B60Q 1/324 | 340/438 |
| 2013/0091770 A1* | 4/2013 | Chen | E05F 15/43 | 49/28 |

(Continued)

FOREIGN PATENT DOCUMENTS

| | | |
|---|---|---|
| CN | 104828001 A | 8/2015 |
| CN | 107415879 A | 12/2017 |
| DE | 196 42 669 C1 | 3/1998 |

(Continued)

OTHER PUBLICATIONS

PCT/EP2021/062148, International Search Report dated Jul. 19, 2021 (Two (2) pages).

(Continued)

*Primary Examiner* — Julie A Bannan
(74) *Attorney, Agent, or Firm* — Crowell & Moring LLP

(57) ABSTRACT

A component arrangement includes a carrier element, a first component element connected to the carrier element by a first latching connection, and a second component element connected to the first component element by a second latching connection. The first latching connection includes a first latching hook and the second latching connection includes a second latching hook. The second latching hook engages form-fittingly around the first latching hook to provide the second latching connection.

6 Claims, 2 Drawing Sheets

(56) References Cited

U.S. PATENT DOCUMENTS

2015/0217710 A1 8/2015 Kemnitz et al.

FOREIGN PATENT DOCUMENTS

| | | | | | |
|---|---|---|---|---|---|
| DE | 10 2010 008 737 A1 | | 2/2011 | | |
| DE | 10 2013 021 381 A1 | | 7/2014 | | |
| FR | 2 896 729 A1 | | 8/2007 | | |
| FR | 2 912 099 A1 | | 8/2008 | | |
| GB | 2599421 | * | 4/2022 | ............. | B60R 21/21 |
| WO | WO-2007088287 A2 | * | 8/2007 | ............. | B60N 2/466 |

OTHER PUBLICATIONS

German Search Report issued in German application No. 10 2020 115 393.7 dated Dec. 28, 2020, with Statement of Relevancy (Eight (8) pages).

English translation of Chinese-language Office Action issued in Chinese Application No. 202180022558.8 dated Feb. 13, 2025 (6 pages).

* cited by examiner

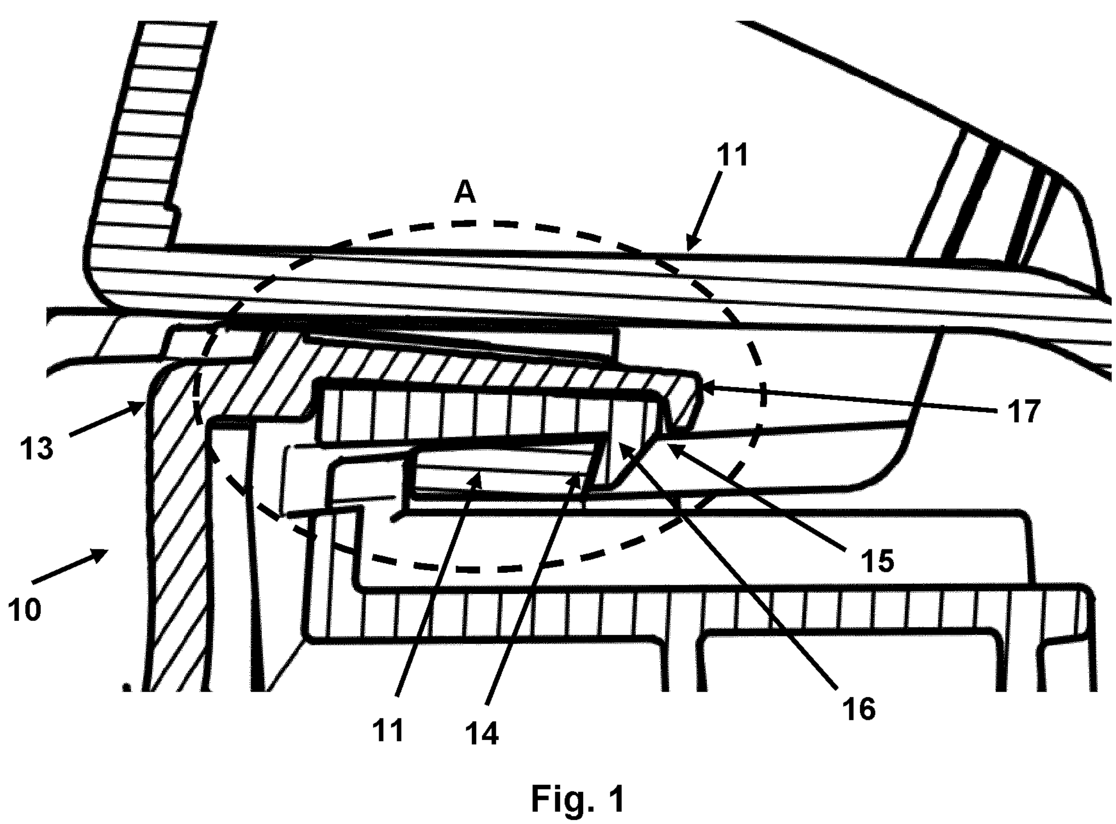
Fig. 1
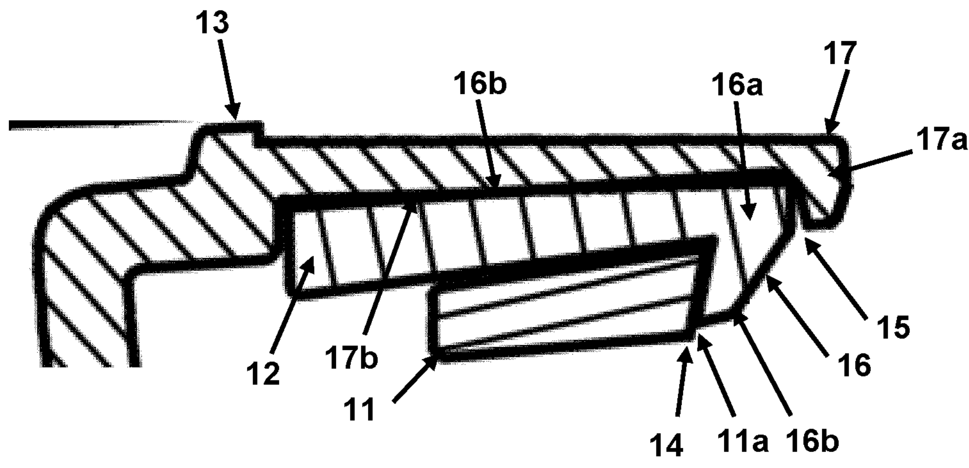
Fig. 2 (Detail A)

COMPONENT ASSEMBLY COMPRISING SPACE-SAVING DETENT CONNECTION

BACKGROUND AND SUMMARY OF THE INVENTION

The invention relates to a component arrangement and to a vehicle having a corresponding component arrangement.

For the straightforward and cost-effective yet reliable connection of components, latching connections are common. This type of component connection is also frequently used in vehicle construction. Components can be connected together either by separate latching elements, known as clips, or via latching hooks, which may be in one piece with the particular component and are brought into engagement with a second component.

For each latching connection, sufficient space is usually required in order for it to be possible to ensure reliable latching. However, if several individual components are intended to be connected to form a common component arrangement, a large number of latching connections are usually required, the arrangement of which can cause significant difficulties in particular in confined space conditions.

Therefore, it is an object of the invention to further develop a component arrangement having a plurality of latching connections in an advantageous manner, in particular to provide a space-saving arrangement.

Accordingly, a component arrangement is provided, having a carrier element and a first component element, which is connected to the carrier element by means of a first latching connection, and a second component element, which is connected to the first component element by means of a second latching connection, wherein the first latching connection comprises a first latching hook and the second latching connection comprises a second latching hook. Furthermore, the second latching hook engages form-fittingly around the first latching hook to provide the second latching connection.

Accordingly, the component arrangement thus has at least three separate elements, which are connected together via the two latching connections: the carrier element, the first component element and the second component element.

The first component element is connected form-fittingly to the carrier element by means of the first latching connection in that the first latching hook is engaged form-fittingly with the carrier element. The following text refers in each case to a first latching hook. However, it will be understood that the first latching connection can comprise not just one first latching hook but also a plurality of first latching hooks, which are formed in an identical manner and are engaged with the carrier element in order to latch the first component element to the carrier element.

For example, the first latching hook, in order to provide the first latching connection, can be engaged form-fittingly with the carrier element in that the carrier element has an undercut at which the first latching hook can be hooked in place or is engaged for the form-fitting connection. The undercut can be formed for example by a recess or an extension of the carrier element.

The second component element, by contrast, is (at least in the region of the latching connections) not directly fastened to the carrier element but is connected form-fittingly to the first component element, more specifically: to the first latching hook, with the aid of the second latching hook of the second latching connection. The second latching hook thus establishes a form-fitting connection to the first latching hook by engaging form-fittingly around the latter.

The following text refers in each case to a second latching hook. However, it will be understood that the second latching connection can comprise not just one second latching hook but also a plurality of second latching hooks, which are formed in an identical manner and are engaged with the first component element in order to latch the second component element to the first component element.

With the described component, it is possible to use the space required for each particular latching hook, including a mounting space that is additionally necessary on account of elastic deformation of each particular latching hook during mounting, jointly for both latching hooks. Optionally, this can be provided with slightly larger dimensions than just for one of the two latching hooks, but may in any case have much smaller dimensions than would be required in total with the two latching hooks arranged at different points. The described component arrangement is thus particularly space-saving and can therefore also be used in regions with very limited space.

For example, a hook-like extension of the second latching hook can engage form-fittingly around a head region of the first latching hook. This means that the head region of the first latching hook forms an undercut at which the hook-like extension of the second latching hook can hook in place or engage. The second latching hook is thus firmly retained on the first latching hook.

According to one embodiment, the first latching hook may have an outer side that faces away from the carrier element and faces an inner side of the second latching hook. This means that the second latching hook and the first latching hook are arranged in a sandwich-like manner with respect to one another. For example, the two latching hooks can even rest in a sandwich-like manner on one another. For example, the inner side of the second latching hook can, in the installed state, bear at least in part, i.e., partially or fully, on the outer side of the first latching hook.

For example, the first latching hook can be mounted on the carrier element first, since, to this end, elastic deformation of the first latching hook is required. The first latching hook has to yield to the carrier element during mounting, in order to latch or snap into place in the final installation position in engagement with the carrier element. This would possibly be prevented by the second latching hook arranged on the outer side of the first latching hook if the first and the second component were already latched together beforehand.

Once, however, the first latching hook is mounted, the second latching hook can subsequently be fitted easily on the first latching hook and a compact and space-saving component arrangement can be created.

Of course, further latching hooks can be provided, which are fitted in the same way on the second latching hook or the latching hook arranged respectively underneath, as is described for the second latching hook and the first latching hook. Any number of latching hooks can be arranged one on top of another, wherein the respectively lower latching hook (analogously to the described first latching hook) is always mounted first and subsequently the latching hook arranged on top (analogously to the described second latching hook) is fitted on the lower latching hook. In this way, a sandwich-like structure can be created from as many latching hooks as desired. Each of the latching hooks can, to this end, be formed as per the description of the first or second latching hook, respectively. The description given is analogously applicable, mutatis mutandis.

In principle, the described component arrangement can be used in all zones in which latching connections are possible. Preferably, use is possible in vehicles, but also in tools, machines, furniture or in building installations.

Vehicles in the scope of this description include in principle all land vehicles, watercraft and aircraft, which have a corresponding component arrangement. In land vehicles, use is possible both in motor vehicles and in non-driven vehicles, for example bicycles. Besides passenger vehicles and trucks, use is also possible in other motor-driven vehicles, for example wheelchairs, snowmobiles, tricycles or quad bikes and preferably in what are known as tilting vehicles. A tilting vehicle is understood to be, inter alia, motorbikes or motorbike-like motor vehicles, such as motor scooters, in particular tiltable two-, three- or four-wheeled motor scooters, scooters or the like.

For example, the component arrangement can be provided in the vehicle to fasten a sensor to the vehicle.

Thus, the first component element can be a holding frame for the sensor, in particular for a sensor for distance measurement, such as an adaptive cruise control sensor (or ACC sensor for short). These include in particular radar sensors and/or ultrasonic sensors and/or lidar sensors. The sensor is held by the holding frame in the installed state.

According to a preferred embodiment, the second component element may be a trim part for at least partially encasing the first component element. Thus, it is possible for example for the holding frame and the sensor connected thereto to be covered entirely or partially, preferably in peripheral regions of the sensor, by the trim part. For example, the sensor can be held in this way between the holding frame and the trim part.

Furthermore, a vehicle having a component arrangement is provided, wherein the component arrangement is configured as per the description.

Furthermore, the carrier element may be connected to a vehicle structure of the vehicle, in particular to a front fairing and/or a front headlamp arrangement. The carrier element may be embodied as a separate component and be connected to the vehicle structure. Similarly, the carrier element can also be connected in one piece to or formed integrally with the vehicle structure or a component of the vehicle structure.

Preferably, the component arrangement is configured such that the sensor faces in a vehicle longitudinal direction of the vehicle.

The invention is explained in more detail in the following text on the basis of an exemplary embodiment with reference to the drawings.

BRIEF DESCRIPTION OF THE DRAWINGS

FIG. 1 shows a sectional view of a component arrangement according to the description;

FIG. 2 shows a detail view from FIG. 1;

DETAILED DESCRIPTION OF THE DRAWINGS

Figure 3:
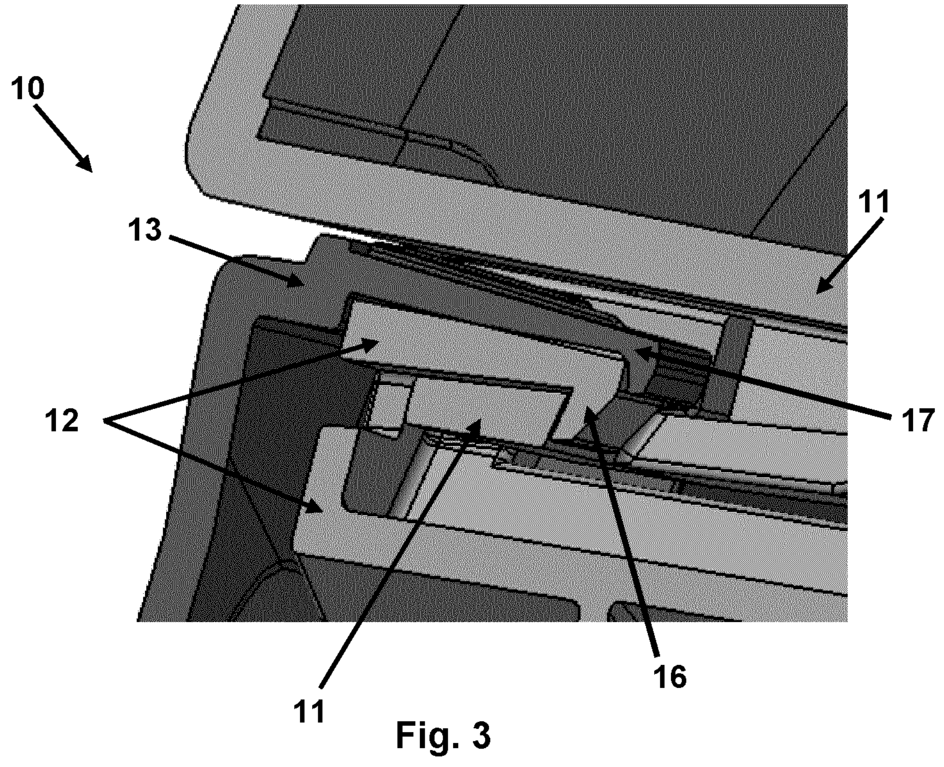
FIG. 3 shows a perspective view of the component arrangement according to FIG. 1.

FIG. 1 shows a sectional view of a component arrangement 10 having a space-saving latching connection. The component arrangement 10 comprises a carrier element 11 and a first component element 12, which is connected to the carrier element 11 by means of a first latching connection 14. In other words, the first latching connection 14 establishes a latchable connection between the carrier element 11 and the first component element 12 in order to fasten the component element 12 to the carrier element 11.

Furthermore, the component arrangement 10 comprises a second component element 13, which is connected to the first component element 12 by means of a second latching connection 15. Accordingly, the second latching connection 15 establishes a latchable connection between the first component element 12 and the second component element 13 in order to fasten the second component element 13 to the first component element 12.

The first latching connection 15 comprises a first latching hook 16. This is formed on the first component element 12, in particular in one piece thereon. The second latching connection 14 comprises a second latching hook 17. This is formed on the second component element 13, in particular in one piece thereon.

In the installed state, the second latching hook 17 engages form-fittingly around the first latching hook 16 to provide the second latching connection 14 (between these two component elements 12, 13).

As can be seen in particular in the detail view A, illustrated in FIG. 2, from FIG. 1 and in the perspective view of the component arrangement 10 in FIG. 3, to this end, a hook-like extension 17*a* of the second latching hook 17 engages form-fittingly around a head region 16*a* of the first latching hook 16.

In addition, the first latching hook 16 is form-fittingly engaged with the carrier element 11 to provide the first latching connection 14. The carrier element 11 can, to this end, have for example an undercut 11*a*, in which the first latching hook 16 can engage with a hook-like extension 16*b*. The undercut 11*a* is provided in the illustrated embodiment by a recess, but can also be provided by an extension formed suitably on the carrier element 11.

As is apparent from the figures, it is possible, with the described component arrangement 10, to use the space required for each particular latching hook 16, 17, including a mounting space which is additionally necessary during mounting on account of elastic deformation of the particular latching hook 16, 17, jointly for both latching hooks 16, 17.

In the illustrated embodiment, the first latching hook 16 has an outer side 16*b* that faces away from the carrier element 11 (at least in the region of the first latching connection 14) and faces an inner side 17*b* of the second latching hook 17. Accordingly, the second latching hook 17 and the first latching hook 16 are arranged in a sandwich-like manner with respect to one another or rest in a sandwich-like manner on one another.

For mounting, the first latching hook 16 can be mounted on the carrier element 11 first, since, to this end, elastic deformation of the first latching hook 16 is required. The first latching hook 16 has to yield to the carrier element 11 during mounting, in order to latch or snap into place in the final installation position in engagement with the carrier element 11. This would otherwise be prevented by the second latching hook 17 arranged on the outer side 16*b* of the first latching hook 16 if the first 12 and the second component element 13 were already latched together beforehand.

Once, however, the first latching hook 16 is mounted, the second latching hook 17 can subsequently be fitted easily on the first latching hook 16 and the compact and space-saving component arrangement 10 can be created.

Figure 4:
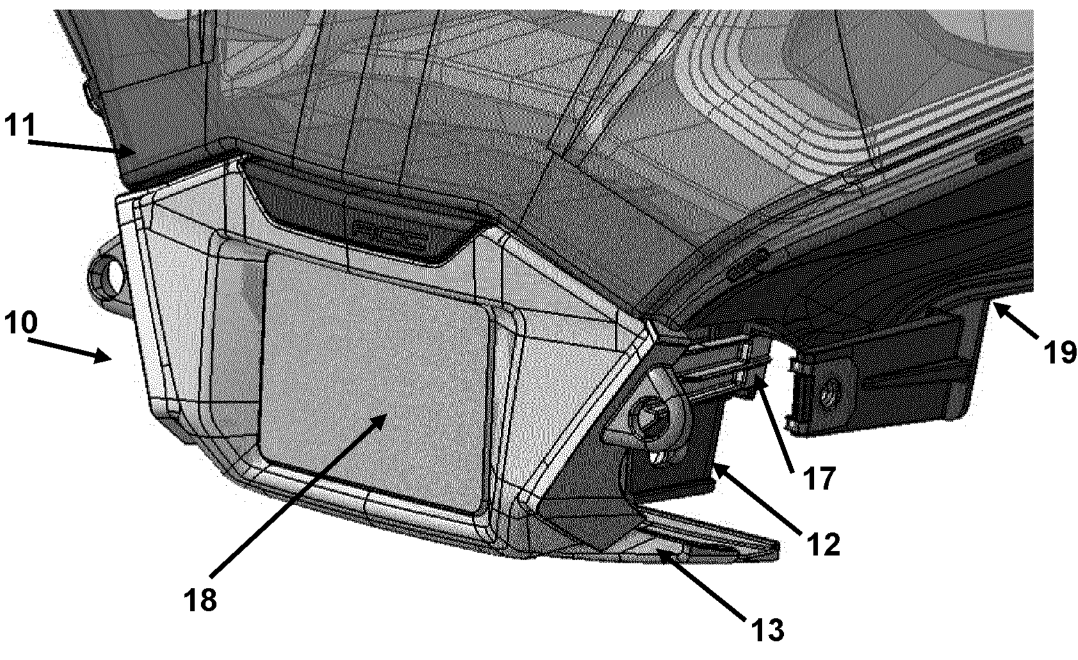
FIG. 4 shows a perspective view of a vehicle front with the component arrangement according to FIGS. 1 to 3.

FIG. 4 shows a perspective, partially illustrated view of a vehicle front of a vehicle (not illustrated further) in the form for example of a motorbike or of a motorbike-like vehicle.

This comprises an exemplary embodiment of the component arrangement 10 according to FIGS. 1 to 3. In this case, the first component element 12 may be a holding frame for a sensor, in particular an ACC sensor facing in the vehicle longitudinal direction and/or in the direction of travel. Moreover, the second component element 13 may be a trim part for encasing the first component element 12. In a state installed on the vehicle, the carrier element 11 may be connected to a vehicle structure 19, in particular to a front fairing and/or a front headlamp arrangement, of the vehicle. The connection of the carrier element to the vehicle structure or to a component of the vehicle structure can be embodied in a multipart or one-piece manner.

By virtue of the component arrangement 10, the sensor 18 can be fastened easily to the carrier element 11 and be at least partially encased.

The invention claimed is:

1. A component arrangement, comprising:

a carrier element;

a first component element which is connected to the carrier element by a first latching connection; and a second component element which is connected to the first component element by a second latching connection;

wherein the first latching connection comprises a first latching hook and the second latching connection comprises a second latching hook;

wherein the second latching hook engages form-fittingly around the first latching hook to provide the second latching connection;

wherein the first component element is a holding frame for a sensor;

wherein the sensor is an ACC sensor.

2. The component arrangement according to claim 1, wherein a hook-like extension of the second latching hook engages form-fittingly around a head region of the first latching hook.

3. The component arrangement according to claim 1, wherein the first latching hook is form-fittingly engaged with the carrier element to provide the first latching connection.

4. The component arrangement according to claim 1, wherein the first latching hook has an outer side that faces away from the carrier element and faces an inner side of the second latching hook.

5. The component arrangement according to claim 1, wherein the second component element is a trim part for at least partially encasing the first component element.

6. A vehicle, comprising:

a component arrangement, comprising:

a carrier element;

a first component element which is connected to the carrier element by a first latching connection; and a second component element which is connected to the first component element by a second latching connection;

wherein the first latching connection comprises a first latching hook and the second latching connection comprises a second latching hook;

wherein the second latching hook engages form-fittingly around the first latching hook to provide the second latching connection;

wherein the carrier element is connected to a vehicle structure and wherein the vehicle structure is a front fairing and/or a front headlamp arrangement.

* * * * *